W. N. BOOTH.
VEHICLE WHEEL AND METHOD OF FORMING THE SAME.
APPLICATION FILED APR. 15, 1918.
1,368,234.
Patented Feb. 15, 1921.
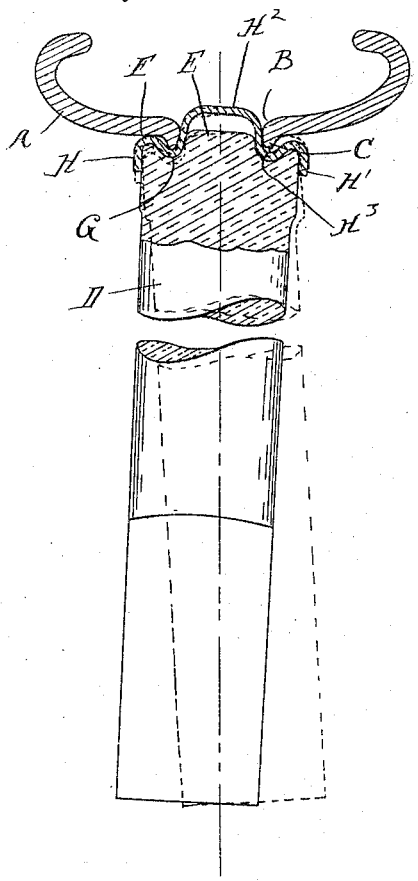
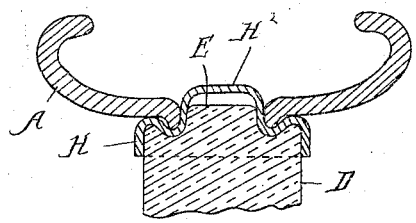
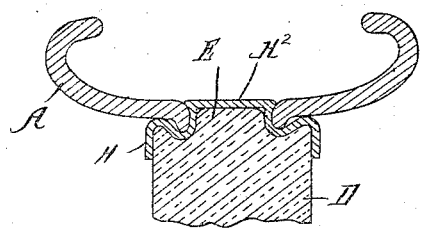
Inventor
William N. Booth
By Whittemore Hulbert & Whittemore
Attorneys

UNITED STATES PATENT OFFICE.

WILLIAM N. BOOTH, OF DETROIT, MICHIGAN.

VEHICLE-WHEEL AND METHOD OF FORMING THE SAME.

1,368,234.  Specification of Letters Patent.  Patented Feb. 15, 1921.

Application filed April 15, 1918. Serial No. 228,689.

*To all whom it may concern:*

Be it known that I, WILLIAM N. BOOTH, a citizen of the United States of America, residing at Detroit, in the county of Wayne and State of Michigan, have invented certain new and useful Improvements in Vehicle-Wheels and Methods of Forming the Same, of which the following is a specification, reference being had therein to the accompanying drawings.

The invention relates to vehicle wheels of that type in which a metallic rim or felly is combined with wooden spokes, and the invention comprises various novel features of construction and method of assembly as hereinafter set forth.

In the drawings:

Figure 1 is a section through the rim or felly of the wheel, showing the manner of engaging the spoke therewith;

Fig. 2 is a similar view with the spoke pressed into position; and

Fig. 3 is a similar view, showing the completed structure.

My invention is applicable to various specific constructions of wheels but is particularly adapted for use in connection with wheels having clencher tire rims which are directly engaged with the spokes. With this specific structure it is desirable to provide the outer face of the clencher rim with a smooth surface so as to form no obstruction or projection to interfere with the seating of the tire. Where such rims are directly connected with the spokes it is necessary to provide tenons on the spokes engaging apertures or recesses in the rim, and on account of the comparatively thin gage of the metal the tenons usually project through the same or beyond the outer face of the rim. This produces an objectionable hump, interfering with the proper seating of the tire. With the present invention I have avoided the difficulty by forming around the tenon-engaging aperture in the rim an inwardly-extending flange and have formed the spoke with a groove in its end surrounding the tenon for engaging this flange. I have further provided the spoke with a metallic cap the end of which conforms to the contour of the spoke to provide the tenon and the groove surrounding the same for receiving the flange. Still another feature of the invention is the means for securing this cap to the tire rim and for forming a flush face with the periphery of the rim, as hereinafter set forth.

In detail, A is the rim or felly, shown as a clencher rim, having a series of apertures B therein for engaging the spokes. In forming these apertures a flange C is also formed and pressed inward, thereby increasing the depth of the metal for engaging the spoke tenon. D is the wooden spoke formed at its outer end with the tenon portion E, the shoulder portion F for seating on the inner face of the rim and the groove G intermediate said shoulder and the tenon to receive the flange C. H is a metallic cap having the flange or ferrule portion H' which surrounds the spoke, the tenon portion $H^2$ and the intermediate portion $H^3$, conforming to the contour of the shoulder F and groove G. The cap when first formed has its tenon portion of greater length than the depth of the flange C, and this portion is also rounded so as to permit of engagement with the aperture B when the spoke is in angular relation to the plane of the wheel. This permits of the initial placing of the spokes alternately upon opposite sides of the plane of the wheel and then forcing their wedge-shaped inner ends into engagement with each other to produce a radial outward movement of the spokes and the forcing of the same into firm engagement with the rim. After the spokes are in final position the projecting rounded ends of the caps are flattened down, as shown in Fig. 3, the wooden spoke being cut away to provide for this flattening. The flattening of the cap also causes the pressing of the metal laterally over the rounded edge of the flange C, producing a lock which holds the cap from movement with respect to the rim. Thus, if through shrinkage or any other cause, the wooden spoke should shorten this cannot permit the cap to disengage from the rim and the only movement will be of the wood within the metallic ferrule.

With the construction as described the periphery of the rim against which the tire is seated will have a substantially smooth unbroken surface, as the flattened ends of the spoke caps will fill and close the apertures B. At the same time the end of the wooden spokes are thoroughly protected by the caps both from mechanical shocks and access of moisture.

What I claim as my invention is:

1. In a vehicle wheel, a spoke having a tenon of reduced diameter, a shoulder on the larger diameter portion, a groove intermediate said tenon and shoulder, and a metallic cap fitting over said tenon and shoulder conforming to the contour thereof and having a portion forming a ferrule surrounding the large diameter shoulder portion.

2. In a vehicle wheel, the combination with a rim having a tenon-engaging aperture and a radially inwardly-turned flange surrounding the same, of a spoke having a tenon engaging said inwardly-extending flange, a groove for receiving said flange and a shoulder portion surrounding said flange and groove and forming an abutting bearing for said rim.

3. In a vehicle wheel, the combination with a rim having a spoke-tenon-engaging aperture with a radially inwardly-extending flange surrounding the same, of a spoke fashioned to form a tenon for engaging said aperture, a groove for engaging said flange and a shoulder for abutting against the rim portion surrounding said flange, and a metallic cap conforming to the contour of said tenon, groove and shoulder and extending inward to form a ferrule surrounding the end of the spoke.

4. In a vehicle wheel, the combination with a rim having a spoke-tenon-engaging recess with a radially inwardly-extending flange surrounding the same, of a spoke having a tenon portion for engaging said recess, a shoulder portion for abutting against said rim and a groove intermediate said shoulder and tenon to receive said flange, and a ferrule surrounding the portion of said spoke adjacent to said shoulder.

5. In a vehicle wheel, the combination with a rim provided with a spoke-tenon-engaging aperture and a radially inwardly-extending flange surrounding the same, of a spoke having a metallic cap at the end thereof, said spoke and cap being correspondingly fashioned to form a tenon for engaging said aperture, a shoulder for abutting against the rim, an intermediate groove to receive said flange and a ferrule surrounding the end portion of the spoke.

6. In a vehicle wheel, the combination with a rim having a spoke-tenon-engaging aperture therein, of a wooden spoke and a metallic cap for the end thereof, said spoke and cap being fashioned to form a shoulder for abutting against said rim and a tenon for engaging said aperture, the tenon portion of said cap being locked from disengagement from said rim and having its end substantially flush with the peripheral face of said rim.

7. In a vehicle wheel, the combination with a metallic rim provided with a radially inwardly-struck flange surrounding a tenon-engaging aperture, of a wooden spoke and a metallic cap therefor fashioned to form a tenon portion, an abutting shoulder portion and an intermediate groove or recess for said flange, the tenon portion of said cap being flush with the peripheral face of said rim and being expanded to lock the same from detachment from the rim.

8. The method of assembling vehicle wheels comprising the placing of capped tenoned spokes in engagement with an apertured metallic rim and upsetting the tenon portion of the cap to lock the same from disengagement.

9. The method of attaching spokes to the rim or felly of a vehicle wheel comprising the engagement of metallic caps with the outer ends of the spokes, said caps and spokes having abutting shoulder portions and projecting tenon portions engaging the tenons with apertures in the metallic rim or felly, and upsetting the end of the capped tenon to lock the same from disengagement from the rim and to form a flush joint with the periphery of the rim.

In testimony whereof I affix my signature.

WILLIAM N. BOOTH.